United States Patent
Masuda et al.

(10) Patent No.: US 12,157,110 B2
(45) Date of Patent: Dec. 3, 2024

(54) SEMICONDUCTOR PARTICLES USED IN WATER-SPLITTING PHOTOCATALYST, PHOTOCATALYST FORMED OF SEMICONDUCTOR PARTICLES, AND SYNTHESIS METHOD THEREOF

(71) Applicants: TOYOTA JIDOSHA KABUSHIKI KAISHA, Toyota (JP); TOYODA GOSEI CO., LTD., Kiyosu (JP); KONAN GAKUEN, Kobe (JP)

(72) Inventors: Taizo Masuda, Yokohama (JP); Ryota Tomizawa, Mishima (JP); Tatsuya Hasegawa, Kiyosu (JP); Shigeru Ikeda, Takarazuka (JP)

(73) Assignees: TOYOTA JIDOSHA KABUSHIKI KAISHA, Toyota (JP); TOYODA GOSEI CO., LTD., Kiyosu (JP); KONAN GAKUEN, Kobe (JP)

( * ) Notice: Subject to any disclaimer, the term of this patent is extended or adjusted under 35 U.S.C. 154(b) by 127 days.

(21) Appl. No.: 17/944,557

(22) Filed: Sep. 14, 2022

(65) Prior Publication Data

US 2023/0096060 A1 Mar. 30, 2023

(30) Foreign Application Priority Data

Sep. 30, 2021 (JP) .................. 2021-162409

(51) Int. Cl.

| | |
|---|---|
| *B01J 23/652* | (2006.01) |
| *B01J 23/10* | (2006.01) |
| *B01J 23/75* | (2006.01) |
| *B01J 35/00* | (2024.01) |
| *B01J 35/02* | (2006.01) |
| *B01J 35/33* | (2024.01) |
| *B01J 35/39* | (2024.01) |
| *B01J 35/50* | (2024.01) |
| *B01J 37/02* | (2006.01) |
| *B01J 37/04* | (2006.01) |
| *B01J 37/08* | (2006.01) |
| *C01B 3/04* | (2006.01) |
| *C01B 13/02* | (2006.01) |

(52) U.S. Cl.
CPC .......... *B01J 23/6522* (2013.01); *B01J 23/10* (2013.01); *B01J 23/75* (2013.01); *B01J 35/33* (2024.01); *B01J 35/39* (2024.01); *B01J 35/50* (2024.01); *B01J 37/0221* (2013.01); *B01J 37/04* (2013.01); *B01J 37/088* (2013.01); *C01B 3/042* (2013.01); *C01B 13/0207* (2013.01)

(58) Field of Classification Search
CPC ........ B01J 23/6522; B01J 23/10; B01J 23/75; B01J 35/39; B01J 35/50; B01J 35/33; B01J 37/0221; B01J 37/04; B01J 37/088; C01B 13/0207; C01B 3/042
See application file for complete search history.

(56) References Cited

PUBLICATIONS

Goto et al., Joule, (2018), v.2, p. 509-520.*
Ham et al., J Mater Chem A, (2016), v.4, 3027-3033.*
Takata et al., JACS, (2015), v.137, 9627-9634.*
Takata et al., JACS, (2015), v.137, 9627-9634, supporting information.*
T.Takata,et al.,"Photocatalytic water splitting with a quantum efficiency of almost unity" Nature vol. 581(2020), 411-414, https://doi.org/10.1038/s41586-020-2278-9, May 27, 2020.
Takata et al., "Fabrication of a Core-Shell-Type Photocatalyst via Photodeposition of Group IV and V Transition Metal Oxyhydroxides: An Effective Surface Modification Method for Overall Water Splitting", Journal of the American Chemical Society, vol. 137 (2015), pp. 9627-9634.

* cited by examiner

*Primary Examiner* — Yong L Chu
(74) *Attorney, Agent, or Firm* — Dinsmore & Shohl LLP

(57) ABSTRACT

Semiconductor particles are used as a photocatalyst for inducing a water-splitting reaction where water molecules decompose into oxygen molecules and hydrogen molecules by addition of a co-catalyst and light irradiation, the semiconductor particles including strontium titanate doped with scandium. A synthesis method of a semiconductor for the photocatalyst includes a synthesis step of synthesizing the semiconductor particles including strontium titanate doped with scandium by mixing strontium chloride ($SrCl_2$), strontium titanate ($SrTiO_3$), and scandium oxide ($Sc_2O_3$) and firing the mixture.

9 Claims, 2 Drawing Sheets

SEMICONDUCTOR PARTICLES USED IN WATER-SPLITTING PHOTOCATALYST, PHOTOCATALYST FORMED OF SEMICONDUCTOR PARTICLES, AND SYNTHESIS METHOD THEREOF

CROSS-REFERENCE TO RELATED APPLICATION

This application claims priority to Japanese Patent Application No. 2021-162409 filed on Sep. 30, 2021, incorporated herein by reference in its entirety.

BACKGROUND

1. Technical Field

The disclosure relates to semiconductor particles that are used in a photocatalyst for inducing a water-splitting reaction where water decomposes into hydrogen and oxygen, a photocatalyst that is prepared using the semiconductor particles, and a synthesis method thereof.

2. Description of Related Art

Hydrogen gas is expected to be used as the next-generation clean fuel that does not emit carbon dioxide even when being burned. Hydrogen gas can be produced from a water-splitting reaction induced by light energy using a photocatalyst. Therefore, the development of a photocatalyst that can efficiently induce a photoinduced water-splitting reaction has progressed. As an example of the high-efficiency photocatalyst include a photocatalyst, a quantum efficiency of almost 1 in a water-splitting reaction and a synthesis method thereof were reported in T. Takata et al., Nature, Volume 581, 411-414 (2020). In T. Takata et al., Nature, Volume 581, 411-414 (2020), to put it briefly, a photocatalyst that is formed by attaching, for example, an oxide of rhodium (Rh), chromium (Cr), or cobalt (Co) to crystal facets of particles of a semiconductor ($SrTiO_3$:Al) in which strontium titanate ($SrTiO_3$) is doped with aluminum (Al) exhibits an (external) quantum efficiency of 96% in a water-splitting reaction induced by irradiation of light having a wavelength of 350 nm to 360 nm (the (external) quantum efficiency refers to a value obtained by dividing the number of reduced hydrogen atoms (=the number of produced hydrogen molecules×2) by the number of emitted photons; hereinafter, in the present specification, "quantum efficiency" refers to the (external) quantum efficiency). The reason why the high quantum efficiency is obtained is that, in the structure of the photocatalyst, $Rh/Cr_2O_3$ and CoOOH are deposited to different crystal facets of $SrTiO_3$:Al particles, such that transfer of charge produced by light to the particle surfaces is achieved without backward charge transfer.

SUMMARY

T. Takata et al., Nature, Volume 581, 411-414 (2020) reported that the semiconductor particles $SrTiO_3$:Al that achieves a quantum efficiency of 96% was prepared by crushing and mixing powders of $SrTiO_3$, $Al_2O_3$, and $SrCl_2$ in an agate mortar and firing the mixture (raw material mixture) in an alumina crucible in a state where $SrCl_2$ was melted at 1150° C. for 10 hours. However, according to a reproductive experiment by the present inventors, the quantum efficiency reached only 8% to 28% (in 37 trials, average value: 16%, standard deviation: 3.56%) in a water-splitting reaction using a photocatalyst that was actually prepared using the particles obtained by firing the raw material mixture at 1150° C. for 10 hours as described in T. Takata et al., Nature, Volume 581, 411-414 (2020). In addition, the present inventors investigated the (external) quantum efficiencies of photocatalysts obtained while changing the firing temperature and the firing time to various values when the raw material mixture was fired to obtain the $SrTiO_3$:Al particles, and verified that a variation in the average value of the (external) quantum efficiency relative to the firing temperature and the firing time is large as shown in Table 1 below and the widths of ranges of the conditions including the firing temperature and time for achieving a high efficiency are narrow. For example, it was verified from Table 1 that, when there was only a difference of about 20° C. in the preset temperature during firing, there was a case where the quantum efficiency of the photocatalyst formed of the obtained semiconductor particles was significantly changed (when the firing time was 10 h and the firing temperature was changed from 1150° C. to 1175° C., there was a difference of about 30% in quantum efficiency). In addition, the variation in quantum efficiency relative to the firing temperature and the firing time was 3% to 10% in terms of standard deviation. This implies that, when the semiconductor particles are prepared with the composition in T. Takata et al., Nature, Volume 581, 411-414 (2020), whether or not a photocatalyst having a high quantum efficiency is obtained is likely to be affected by the temperature to which the raw material mixture is exposed during firing. When the mixture is actually fired to obtain the $SrTiO_3$:Al particles, air is circulated using a circulation fan, such that a temperature distribution is uniform in a firing furnace, but convection does not substantially occur in a crucible, such that there may be unevenness in temperature. As a result, it is presumed that the quantum efficiency of the photocatalyst decreases and varies. In either case, the decrease or the fluctuation or variation in the quantum efficiency of the photocatalyst relative to the firing temperature or the firing time during the firing of the semiconductor particles is not desirable from the viewpoints of large-scale synthesis and practical application of the photocatalyst.

TABLE 1

Quantum Efficiency (Average Value ± Standard Deviation) when Firing Temperature and Time during Synthesis of Semiconductor Particles are changed

| | | Firing Temperature (° C.) | | | |
| --- | --- | --- | --- | --- | --- |
| | | 1150 | 1175 | 1185 | 1200 |
| Firing | 10 | 16% ± 3.7% | 48% ± 8.6% | 46% ± 5.0% | 49% ± 3.2% |
| Time | 15 | 61% ± 12.2% | 50% ± 8.9% | 67% ± 10.3% | 50% ± 6.2% |
| (Hours) | 30 | 41% ± 3.6% | 51% ± 6.2% | 66% ± 4.8% | 46% ± 3.2% |

The number of trials for each condition was three (1150° C., 37 trials only for 10 hours)

Accordingly, the present inventors conducted development research on a photocatalyst suitable for large-scale synthesis and practical application and found that, when semiconductor particles obtained by adding scandium to a raw material mixture including strontium titanate and firing the raw material mixture are used, a photocatalyst that stably achieves a high quantum efficiency in a photoinduced water-splitting reaction can be prepared. Specifically, this implies that, when semiconductor particles obtained by doping strontium titanate with scandium are used, a photocatalyst that stably achieves a quantum efficiency of more than 70% can be obtained by adjusting conditions. In addition, this implies that, when strontium titanate is doped with scandium, a photocatalyst that achieves a certain high degree of quantum efficiency can be obtained without being doped with aluminum. In the disclosure, this finding is used.

The disclosure provides a photocatalyst that achieves a high quantum efficiency as stably as possible in a photoinduced water-splitting reaction, the photocatalyst being suitable for large-scale synthesis and practical application.

In addition, the disclosure provides semiconductor particles that provides a photocatalyst as described above, a photocatalyst formed of the semiconductor particles, and a method of synthesizing the same.

A first aspect of the disclosure relates to semiconductor particles that are used as a photocatalyst for inducing a water-splitting reaction where water molecules decompose into oxygen molecules and hydrogen molecules by light irradiation with a co-catalyst, the semiconductor particles including strontium titanate doped with scandium.

In the configuration, "photocatalyst" refers to a material that induces a water-splitting reaction by light irradiation as described above, such that water can be reduced to produce oxygen molecules (oxygen gas) and hydrogen molecules (hydrogen gas). "The photocatalyst" is basically a material obtained by adding a co-catalyst to semiconductor particles including strontium titanate as in the photocatalyst described in T. Takata et al., Nature, Volume 581, 411-414 (2020). In the present disclosure, the semiconductor particles including strontium titanate are doped with scandium. The co-catalyst to be added to the semiconductor particles when the semiconductor particles are used as the photocatalyst for the water-splitting reaction, and a method of adding the co-catalyst may be the same as those described in T. Takata et al., Nature, Volume 581, 411-414 (2020) or other techniques in the related art. When the semiconductor particles including strontium titanate are doped with scandium as in the disclosure, as described in an embodiment described below, the quantum efficiency of the photocatalyst is stably higher, that is, a variation in quantum efficiency is smaller and the average value is higher as compared to a case where semiconductor particles that are not doped with scandium are used as a photocatalyst.

The semiconductor particles of the photocatalyst according to the disclosure may be synthesized using a method including a synthesis step of synthesizing the semiconductor particles including strontium titanate doped with scandium by mixing strontium chloride ($SrCl_2$), strontium titanate ($SrTiO_3$), and scandium oxide ($Sc_2O_3$) to obtain a mixture and firing the mixture. Accordingly, a second aspect of the disclosure relates to a synthesis method of semiconductor particles including strontium titanate in a photocatalyst for inducing a water-splitting reaction where water molecules decompose into oxygen molecules and hydrogen molecules by light irradiation, the photocatalyst being formed by adding a co-catalyst to the semiconductor particles including strontium titanate. The synthesis method includes the step of synthesizing the semiconductor particles.

In the configuration of the method and the semiconductor particles according to the disclosure, in the synthesis of the semiconductor particles, the scandium oxide may be mixed at a molar ratio of 0.001 to 0.05 with respect to strontium titanate. As a result, a photocatalyst that achieves a higher quantum efficiency with a smaller variation (smaller standard deviation) as compared to a case where semiconductor particles are not doped with scandium can be obtained. In some embodiments, in the synthesis of the semiconductor particles, the scandium oxide may be mixed at a molar ratio of 0.001 to 0.007 with respect to strontium titanate. As a result, a photocatalyst that achieves a higher quantum efficiency can be obtained.

In addition, in the configuration of the semiconductor particles according to the disclosure, the semiconductor particles may be further doped with aluminum. In the synthesis of the semiconductor particles, strontium titanate may be doped with aluminum by mixing strontium chloride ($SrCl_2$), strontium titanate ($SrTiO_3$), scandium oxide ($Sc_2O_3$), and aluminum oxide ($Al_2O_3$) to obtain a mixture and firing the mixture. More specifically, aluminum oxide may be mixed at a molar ratio of 0.02 with respect to strontium titanate. It was found that, by doping the semiconductor particles with aluminum, a photocatalyst that achieves a higher quantum efficiency as compared to a case where the semiconductor particles are doped with only scandium can be obtained.

As described above, the semiconductor particles for the photocatalyst according to the disclosure are synthesized as particles where strontium titanate is doped with scandium or further aluminum by mixing strontium chloride, strontium titanate, and scandium oxide or further mixing aluminum oxide and firing the mixture. In this firing, strontium chloride melts to become a liquid, and scandium atoms or further aluminum atoms penetrate into strontium titanate in the liquid, such that strontium titanate is doped with scandium or aluminum. As a result, particles of Sc—$SrTiO_3$ or Al—Sc—$SrTiO_3$ are formed. Accordingly, in the firing step, conditions of the firing temperature and time may be appropriate set such that the particles of Sc—$SrTiO_3$ or Al—Sc—$SrTiO_3$ are formed. Specifically, as the conditions during firing in the synthesis, according to an experiment, the firing temperature may be 1150° C. to 1200° C., and the firing time may be 10 hours to 30 hours, but the conditions are not limited thereto.

In order to give a photocatalytic function to the semiconductor particles obtained according to the instructions of the disclosure, as described above, the co-catalyst that is appropriately selected may be added as in the related art. The addition of the co-catalyst can be achieved by executing a step of adding the co-catalyst to surfaces of the semiconductor particles dispersed in water using any method. The co-catalyst to be added to the semiconductor particles may be rhodium chromium oxide (Rh/$Cr_2O_3$) and cobalt hydroxide oxide (CoOOH) as in T. Takata et al., Nature, Volume 581, 411-414 (2020). In some embodiments, these co-catalyst can be added by photodeposition to the surfaces of the semiconductor particles dispersed in water. When the co-catalyst is added by photodeposition, for example, the amounts of Rh, Cr, and Co may be about 0.1 wt %, 0.05 wt %, and 0.05 wt % with respect to the amount of the semiconductor particles, respectively. However, the disclosure is not limited to this example.

Thus, according to the disclosure, semiconductor particles obtained by doping strontium titanate with scandium are used as semiconductor particles including strontium titanate in a photocatalyst for inducing a water-splitting reaction where water molecules decompose into oxygen molecules and hydrogen molecules by light irradiation, and the photocatalyst being formed by adding a co-catalyst to the semiconductor particles including strontium titanate. As a result, a photocatalyst having a higher quantum efficiency value in the water-splitting reaction and a smaller variation as compared to the related art can be synthesized with high reproducibility. With the method and the semiconductor particles according to the disclosure, characteristics relating to the quantum efficiency of the photocatalyst are more stable. The method and the semiconductor particles according to the disclosure are more suitable for large-scale synthesis and practical application of a photocatalyst for manufacturing hydrogen gas.

Other objects and advantages of the disclosure will be clarified based on description of the following embodiment of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Synthesis Method of Semiconductor Particles for Water-Splitting Reaction Photocatalyst and Photocatalyst Semiconductor particles for a water-splitting reaction photocatalyst according to an embodiment are synthesized by mixing strontium chloride ($SrCl_2$), strontium titanate ($SrTiO_3$), and scandium oxide ($Sc_2O_3$) or further mixing aluminum oxide ($Al_2O_3$) to obtain a raw material mixture, heating the raw material mixture to a temperature at which $SrCl_2$ melts to become a liquid (temperature at which $SrTiO_3$, $Sc_2O_3$, and $Al_2O_3$ do not melt), and doping $SrTiO_3$ with scandium atoms (Sc) or further with aluminum atoms (Al) to form a semiconductor of $SrTiO_3$ (flux method). A photocatalyst is synthesized by adding a material as a co-catalyst, for example, by photodeposition to the semiconductor particles obtained using the flux method.

Figure 1:
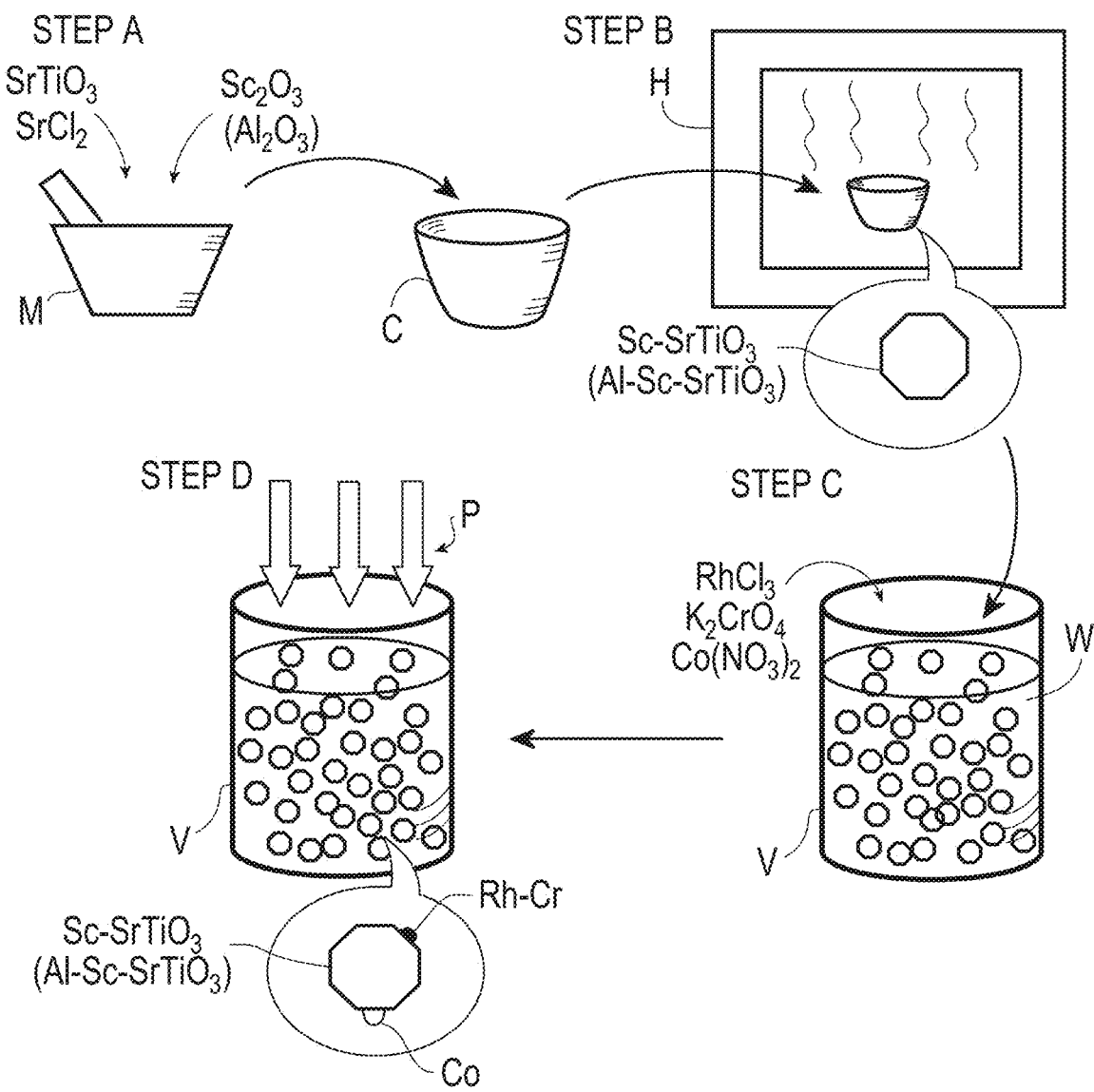
FIG. 1 is a schematic diagram showing a step of a synthesis method of semiconductor particles according to the disclosure and a photocatalyst formed of the semiconductor particles.

Specifically, in the synthesis method of the semiconductor particles, first, $SrTiO_3$ powder and $Sc_2O_3$ powder or further $Al_2O_3$ powder are mixed with a large amount of $SrCl_2$ powder with reference to FIG. 1. (step A of FIG. 1). The powders are mixed, for example, by grinding the powders in an agate mortar M (about 30 minutes). In the mixture (raw material mixture) of the powders, the amount of $SrCl_2$ may be about 10 times with respect to the amount of $SrTiO_3$, for example, by molar ratio. When the powders are used, the amount of the $Al_2O_3$ powder may be the same as described in T. Takata et al., Nature, Volume 581, 411-414 (2020) and may be, for example, about 0.02 by molar ratio with respect to the amount of $SrTiO_3$. According to an experiment by the present inventors, the amount of the $Sc_2O_3$ powder may be 0.001 to 0.05 by molar ratio with respect to the amount of $SrTiO_3$ and found that, when the molar ratio of the $Sc_2O_3$ powder is 0.001 to 0.007, 0.001 to 0.005, or 0.003 to 0.005, a photocatalyst with a high quantum efficiency can be obtained.

Next, the raw material mixture of the powders is transferred to a crucible for firing, for example, an alumina crucible C and is fired in a firing furnace H (step B in FIG. 1). In this step, the firing temperature is a temperature (874° C. or higher) at which $SrCl_2$ melts to become a liquid as described above, may be a temperature (2072° C. or lower) at which $SrTiO_3$, $Sc_2O_3$, and $Al_2O_3$ do not melt, may be, for example, about 1000° C. to 1400° C., and may be 1150° C. to 1200° C. In addition, the firing time for which the raw material mixture is exposed to the temperature is a period of time that is sufficient for doping $SrTiO_3$ with Sc or further with Al to form a semiconductor of $SrTiO_3$. According to the experiment by the present inventors, the firing time may be 10 hours to 30 hours or about 30 hours.

When the fired material is cooled to normal temperature after the firing step, water (or distilled water) is added to the crucible C, the fired material in the crucible is dispersed in water as particles while ultrasonic waves are applied to the fired material using an ultrasonic stirrer or the like to stir the fired material, and the fired material is further collected by filtration under reduced pressure or the like. The particulate fired material is semiconductor particles (Sc—$SrTiO_3$ or Al—Sc—$SrTiO_3$) for the photocatalyst according to the embodiment. The collected semiconductor particles may be cleaned with water. The semiconductor particles may be cleaned until the pH of cleaning water is 7 and the cleaning water does not include chlorine. Thus, the semiconductor particles may be dried after being cleaned.

In order to function the semiconductor particles as a photocatalyst, the co-catalyst is added to crystal facets of the semiconductor particles. It is presumed that the co-catalyst prevents charge (electrons and holes) produced by the light irradiation in the semiconductor particles and transferred to surfaces of the semiconductor particles in a photoinduced water-splitting reaction from being transferred backward again to the inside of the semiconductor particles. In the embodiment, the co-catalyst may be added to the semiconductor particles using any method. Typically, as described above, by depositing the co-catalyst on the crystal facets of the semiconductor particles dispersed in water by photodeposition as in T. Takata et al., Nature, Volume 581, 411-414 (2020), the co-catalyst may be added to the semiconductor particles. Specifically, first, the semiconductor particles are dispersed in water in a transparent container V such as a glass container (step C in FIG. 1). Ultrasonic waves are applied to water W (semiconductor particle dispersion liquid) in which the semiconductor particles are dispersed such that the semiconductor particles are uniformly dispersed. Next, a treatment of adding a salt as a raw material of the co-catalyst and depositing a metal oxide as the co-catalyst on surfaces of the semiconductor particles by irradiation of light P is executed (step D in FIG. 1).

Figure 2:
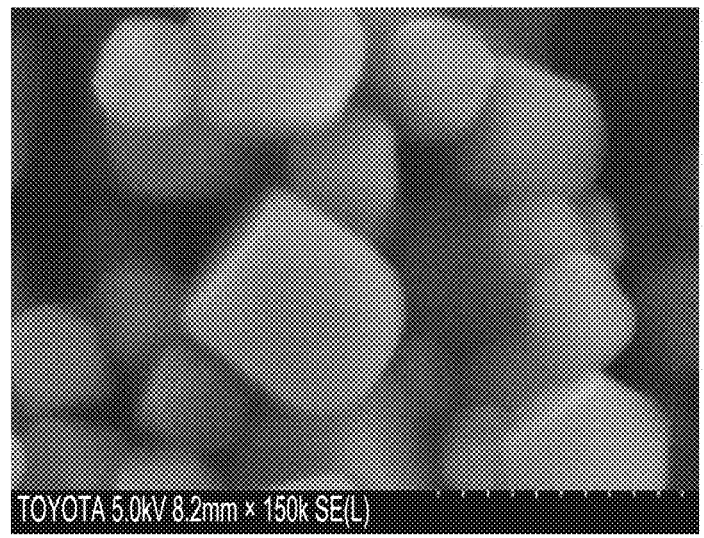
FIG. 2 is an electron microscope image of the photocatalyst synthesized using the method according to the disclosure.

More specifically, when rhodium chromium oxide (Rh/$Cr_2O_3$) and cobalt hydroxide oxide (CoOOH) are used as the co-catalyst to be added to the surfaces of the semiconductor particles as in T. Takata et al., Nature, Volume 581, 411-414 (2020), the following step may be executed. That is, first, a rhodium chloride ($RhCl_3$) aqueous solution is added to the semiconductor particle dispersion liquid such that the amount of rhodium (Rh) is 0.1 wt % with respect to the amount of the semiconductor particles, and the semiconductor particle dispersion liquid is irradiated with light from a xenon lamp (300 W, 20 mA) at the atmospheric pressure for 10 minutes. Next, a potassium chromate ($K_2CrO_4$) aqueous solution is added to the semiconductor particle dispersion liquid such that the amount of chromium (Cr) is 0.05 wt % with respect to the amount of the semiconductor particles, and the semiconductor particle dispersion liquid is irradiated with light from a xenon lamp (300 W, 20 mA) at the atmospheric pressure for 5 minutes. Next, a cobalt nitrate ($Co(NO_3)_2$) aqueous solution is added to the semiconductor particle dispersion liquid such that the amount of cobalt (Co) is 0.05 wt % with respect to the amount of the semiconductor particles, and the semiconductor particle dispersion liquid is irradiated with light from a xenon lamp (300 W, 20 mA) at the atmospheric pressure for 5 minutes. As a result, as schematically illustrated in step D of FIG. 1, the Rh—Cr oxide and the Co hydroxide oxide are deposited on the surfaces of the semiconductor particles, and thus the prepared composite functions as a photocatalyst for inducing a photoinduced water-splitting reaction. FIG. 2 is an electron microscope image of the prepared photocatalyst, and the photocatalyst has a form of particles as illustrated in the drawing. In the addition step of adding the co-catalyst to surfaces of the semiconductor particles by photodeposition, the concentration of the salt for the co-catalyst to be added to the semiconductor particle dispersion liquid may be appropriately adjusted. It was found that, as in Experimental Examples described below, for example, when the concentration of the salt for the co-catalyst is four times that described above, the quantum efficiency significantly decreases. In some embodiments, the salt concentration is adjusted not to be excessive. In addition, the addition of the co-catalyst to the surfaces of the semiconductor particles may be executed using an impregnation method (method of adding the salt to the dispersion liquid and applying heat) in addition to photodeposition.

In the photocatalyst that is prepared using the semiconductor particles formed by doping strontium titanate with scandium as described above in the embodiment, as described below, the average value of the quantum efficiency [hydrogen molecules×2/number of emitted photons] in the photoinduced water-splitting reaction is at least 50%, more than 75%, and the standard deviation is about 1% (0.4% to 4.4%). Accordingly, in the synthesis method of the semiconductor particles and the photocatalyst according to the embodiment, as compared to a technique in the related art where scandium is not used (the average value of the external quantum efficiency is 16% to 67%, the standard deviation is 12% (3.2% to 12.2%)), semiconductor particles and a photocatalyst that have a smaller variation and stably achieve a higher quantum efficiency can be provided.

The reason why the photocatalyst that is formed of the semiconductor particles obtained by doping strontium titanate with scandium stably exhibits a high quantum efficiency is presumed to be as follows. According to a current investigation, it was verified that the shape of the semiconductor particles doped with scandium is a polyhedron having a larger roundness (refer to FIG. 2). Therefore, in the rounded polyhedral structure, corners of the cubic are cut, such that most of facets of strontium titanate are exposed, and thus a face where electrons are likely to accumulate and a face where holes are likely to accumulate are formed. As a result, charge separation is further accelerated, and the water-splitting reaction is caused to efficiently occur.

Experimental Examples

Semiconductor particles formed by doping strontium titanate with scandium and a photocatalyst formed of the semiconductor particles were synthesized according to the instructions of the embodiment. The quantum efficiency of the photocatalyst was measured, and the effectiveness of the embodiment was verified. It should be understood that the following experimental examples are examples for verifying the effectiveness of the embodiment and do not limit the range of the disclosure.

The synthesis of the semiconductor particles was performed in the following steps. Specifically, first, $SrCl_2$ powder, $SrTiO_3$ powder, and $Sc_2O_3$ powder or further $Al_2O_3$ powder were crushed and mixed in an agate mortar for 30 minutes. A molar ratio between $SrCl_2$, $SrTiO_3$, and $Al_2O_3$ (only when used) was 10:1:0.02. The molar ratio of $Sc_2O_3$ was 0.001 to 0.05 (0.1 mol % to 5 mol %) with respect to $SrTiO_3$. The mixture of the powders was transferred to an alumina crucible and was fired in a firing furnace while setting the firing temperature and the firing time to various values. In the firing step, the mixture was heated from room temperature to the firing temperature for 2 hours, and was allowed to cool to room temperature for 6 hours after the elapse of the firing time. After allowing the mixture to cool, distilled water was added to the crucible containing the fired material, ultrasonic waves were applied thereto using an ultrasonic stirrer to stir the fired material, and the fired material in the crucible (those deposited to the inner wall of the crucible were dispersed) was dispersed in water in the form of particles and collected by filtration under reduced pressure. Next, the collected particulate fired material was cleaned with distilled water. When the pH of water after cleaning was checked using pH test paper whether or not chlorine was present in the water after cleaning was checked based on whether or not silver chloride was produced after adding 0.1 M silver nitrate to the water after cleaning, the pH of the water after cleaning was 7, and chlorine was not detected. Therefore, the fired material was cleaned. The cleaned particulate fired material, that is, the semiconductor particles were dried at 70° C.

In the preparation of the photocatalyst using the semiconductor particles, 100 mg of the semiconductor particle powder was dispersed in 100 ml of distilled water in a heat-resistant glass container (400 ml). First, a rhodium chloride ($RhCl_3$) aqueous solution was added to the semiconductor particle dispersion liquid such that the amount of rhodium (Rh) was 0.1 wt % with respect to the amount of the semiconductor particles, and the semiconductor particle dispersion liquid was irradiated with light from a xenon lamp (300 W, 20 mA) at the atmospheric pressure for 10 minutes. Next, a potassium chromate ($K_2CrO_4$) aqueous solution was added to the semiconductor particle dispersion liquid such that the amount of chromium (Cr) was 0.05 wt % with respect to the amount of the semiconductor particles, and the semiconductor particle dispersion liquid was irradiated with light from a xenon lamp (300 W, 20 mA) at the atmospheric pressure for 5 minutes using the same method as described above. Finally, a cobalt nitrate ($Co(NO_3)_2$) aqueous solution was added to the semiconductor particle dispersion liquid such that the amount of cobalt (Co) was 0.05 wt % with respect to the amount of the semiconductor particles, and the semiconductor particle dispersion liquid was irradiated with light from a xenon lamp (300 W, 20 mA) at the atmospheric pressure for 5 minutes using the same method as described above. The irradiation of light using the xenon lamp was performed after covering the glass container with a lid of a quartz plate. Thus, the treated semiconductor particle dispersion liquid was used as it is as a solution (photocatalyst dispersion liquid) in which the photocatalyst was dispersed for the measurement of the quantum efficiency.

In the measurement of the quantum efficiency of the photocatalyst, first, the glass container containing the photocatalyst dispersion liquid was deaerated using a vacuum pump and was filled with argon gas. As a result, air in the glass container was replaced with argon gas. Next, the glass container was connected to a gas chromatograph through a glass pipe, the photocatalyst dispersion liquid in the glass container was irradiated with the light from the xenon lamp (300 W, 20 mA) through a 365 nm band pass filter, such that the water-splitting reaction was induced to produce hydrogen gas. In the detection of the amount of hydrogen gas produced, produced hydrogen gas accumulated in the glass pipe while the light irradiation was executed for 2 hours, the accumulated hydrogen gas was introduced into the gas chromatograph, and the amount of hydrogen gas was detected (the measurement was performed three times on a 30-minute basis). In the detection of the amount of hydrogen gas in the chromatograph, a calibration curve between the number of moles of hydrogen and the area of a detection data part corresponding to hydrogen gas was generated using standard gas where the number of moles of hydrogen gas was known. Using this calibration curve, the number of moles produced was determined from the area of the detection data part of the hydrogen gas introduced from the glass pipe into the gas chromatograph. On the other hand, regarding the number of photons emitted to the photocatalyst dispersion liquid in the glass container, the total wattage P (the amount of energy per unit time) of light emitted to the photocatalyst dispersion liquid in the glass container used for the measurement was measured using a photodiode sensor, and the number of photons I incident on the photocatalyst dispersion liquid per unit time was calculated from the following expression.

$$I(/s) = P(W) \times \lambda(m) / [h(J \cdot s) \times c(m/s)]$$

Here, $\lambda$ represents the wavelength of emitted light, h represents the Planck's constant, and c represents the light speed. The quantum efficiency was calculated from the following expression.

$$\text{Quantum Efficiency (\%)} = n(/s) \times NA \times 2 / I \times 100$$

Here, n represents the number of moles of hydrogen gas produced per unit time, and NA represents the Avogadro's number.

In the results, when the photocatalyst was prepared using the semiconductor particles synthesized while changing the firing temperature and the firing time to various values during the synthesis of the powder mixture, the quantum efficiency measured in the photocatalyst under each of the conditions of the firing temperatures and the firing times was as shown in Table 2 below. As the powder mixture, a mixture to which scandium oxide was added at a molar ratio of 0.005 (0.5 mol %) with respect to strontium titanate in the presence of aluminum oxide at a molar ratio of 0.02 (2 mol %) with respect to strontium titanate was used.

TABLE 2

Quantum Efficiency (Average Value ± Standard Deviation) when Firing Temperature and Time during Synthesis of Semiconductor Particles are changed

| | | Firing Temperature (° C.) | | |
|---|---|---|---|---|
| | | 1150 | 1185 | 1200 |
| Firing | 10 | 63% ± 4.4% | 71% ± 1.8% | 76% ± 0.4% |
| Time | 15 | 72% ± 2.1% | 75% ± 2.3% | 75% ± 1.4% |
| (Hours) | 30 | 68% ± 3.4% | 76% ± 0.6% | 78% ± 0.8% |

The number of trials for each condition was three

Referring to the results of Table 2, when the mixture that was prepared by adding scandium oxide to the powder mixture was fired as described above, the average value of the quantum efficiency was higher and the standard deviation was smaller under all of the conditions as compared to the results where scandium was not added (refer to Table 1). In particular, under the conditions of the firing temperature and the firing time described in T. Takata et al., Nature, Volume 581, 411-414 (2020), the average value of the quantum efficiency increased from 16% to 63%. In addition, when the scandium was added at a firing temperature of 1185° C. or higher, a photocatalyst that stably achieved a quantum efficiency of more than 70% to 75% was prepared. The result shows that, when the semiconductor particles are synthesized by doping strontium titanate with scandium, the quantum efficiency of the photocatalyst formed of the semiconductor particles increases and a variation in quantum efficiency can be reduced.

Figure 3:
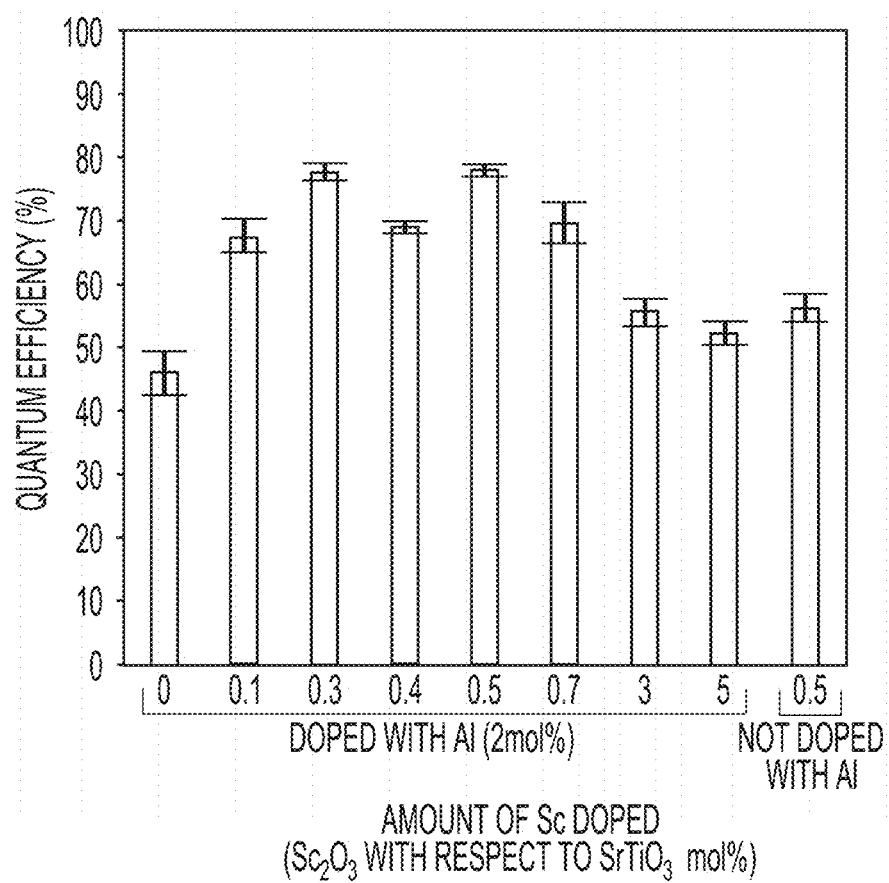
FIG. 3 shows a quantum efficiency that is obtained by the photocatalyst synthesized using the method according to the disclosure, the quantum efficiency being a value when scandium doped with strontium titanate is changed. The bar graph represents an average value, and the error bar represents a standard deviation (the number of trials for each condition was three). The semiconductor particles were synthesized by mixing $SrTiO_3$ and $Sc_2O_3$ or further mixing $Al_2O_3$ in $SrCl_2$ and firing the mixture at a firing temperature of 1200° C. for 30 hours.

Next, when the dependence of the quantum efficiency of the photocatalyst on the amount of scandium was checked by changing the amount of scandium oxide to be added to the powder mixture during the synthesis of the semiconductor particles to various values, the dependence was as shown in the graph of FIG. 3. The firing temperature and the firing time during the synthesis of the semiconductor particles were 1200° C. and 30 hours (the optimal conditions among the results of Table 2). The semiconductor particles were synthesized in the presence of 0.02 (2 mol %) of aluminum oxide with respect to the strontium titanate in the powder mixture, and the semiconductor particles were synthesized in the absence of aluminum oxide.

Referring to FIG. 3, in the photocatalyst formed of the semiconductor particles that were synthesized by adding scandium oxide at a molar ratio of 0.001 to 0.05 (0.1 mol % to 5 mol %) with respect to strontium titanate, the quantum efficiency was high at more than 50% in all of the cases as compared to the results where the semiconductor particles were doped with only aluminum (the amount of scandium oxide was 0 mol %). In particular, when the amount of scandium oxide was 0.1 mol % to 0.7 mol %, the quantum efficiency was about 70% or more. In all of the examples where the amount of scandium oxide was 0.5 mol %, the quantum efficiency was more than 75% and the standard deviation was less than 1%. Further, in the photocatalyst (not doped with Al) formed of the semiconductor particles that were synthesized in the absence of aluminum oxide, the quantum efficiency was higher than that in the photocatalyst formed of the semiconductor particles doped with only aluminum. The results show that: when the semiconductor particles obtained by doping strontium titanate with scandium were used for the photocatalyst, a higher quantum efficiency can be achieved than the semiconductor particles doped with only aluminum; and in particular, when the amount of scandium oxide is 0.1 mol % to 0.7 mol % in the presence of aluminum oxide, a quantum efficiency of about 70% or more can be stably achieved (with a smaller standard deviation).

In the semiconductor particles (firing temperature: 1200° C., firing time: 30 hours, 0.02 of aluminum oxide and 0.005 of scandium oxide were added by molar ratio with respect to strontium titanate) used for the photocatalyst that achieved the maximum quantum efficiency (78%±0.81%) in Table 2, when the salt concentrations during the addition of the co-catalyst were increased to four times those described above (Rh: 0.1 wt % 0.4 wt %; Cr: 0.05 wt % 0.2 wt %; Co: 0.05 wt % 0.2 wt %), the quantum efficiency of the obtained photocatalyst decreased to 35%±2.94%. This result shows that, regarding the salt concentrations during the addition of the co-catalyst, that Rh is about 0.1 wt %, Cr is about 0.05 wt %, and Co is about 0.05 wt % with respect to the amount of the semiconductor particles.

The above description relates to the embodiment of the disclosure, but various modifications and changes can be easily made by those skilled in the art. The disclosure is not limited to only the above exemplary embodiment, and it is obvious that the disclosure is applicable to various devices within a range not departing from the concepts of the disclosure.

What is claimed is:

1. A synthesis method of semiconductor particles including strontium titanate in a photocatalyst for inducing a water-splitting reaction where water molecules decompose into oxygen molecules and hydrogen molecules by light irradiation, the photocatalyst being formed by adding a co-catalyst to the semiconductor particles including strontium titanate, and the synthesis method comprising a synthesis step of synthesizing the semiconductor particles including strontium titanate doped with scandium and aluminum by mixing strontium chloride ($SrCl_2$), strontium titanate ($SrTiO_3$), scandium oxide ($Sc_2O_3$), and aluminum oxide ($Al_2O_3$) to obtain a mixture and firing the mixture, wherein in the synthesis step, the scandium oxide is mixed at a molar ratio of 0.001 to 0.007 with respect to strontium titanate.

2. The synthesis method according to claim 1, wherein in the synthesis step, aluminum oxide is mixed at a molar ratio of 0.02 with respect to strontium titanate.

3. The synthesis method according to claim 1, wherein in the synthesis step, a firing temperature is 1150° C. to 1200° C. and a firing time is 10 hours to 30 hours.

4. A synthesis method of synthesizing a photocatalyst using semiconductor particles synthesized using the synthesis method according to claim 1, the photocatalyst inducing a water-splitting reaction where water molecules decompose into oxygen molecules and hydrogen molecules by light irradiation, and the synthesis method of synthesizing the photocatalyst comprising an addition step of adding the co-catalyst to surfaces of the semiconductor particles dispersed in water.

5. The synthesis method according to claim 4, wherein the co-catalyst is rhodium chromium oxide ($Rh/Cr_2O_3$) and cobalt hydroxide oxide (CoOOH).

6. The synthesis method according to claim 5, wherein in the addition step, the co-catalyst is added by photodeposition to the surfaces of the semiconductor particles dispersed in water.

7. The synthesis method according to claim 1, wherein in the synthesis step, a firing temperature is 1185° C. to 1200° C. and a firing time is 10 hours to 30 hours.

8. The synthesis method according to claim 1, wherein in the synthesis step, a firing temperature is 1185° C. to 1200° C. and a firing time is 15 hours to 30 hours.

9. The synthesis method according to claim 1, wherein the aluminum oxide ($Al_2O_3$) is mixed at a molar ratio of 0.02 with respect to the strontium titanate ($SrTiO_3$).

* * * * *